P. F. BEAULIEU.
SHUTTER LOCK FOR ROLL FILM CAMERAS.
APPLICATION FILED FEB. 24, 1921.
1,413,376.
Patented Apr. 18, 1922.
2 SHEETS—SHEET 2.
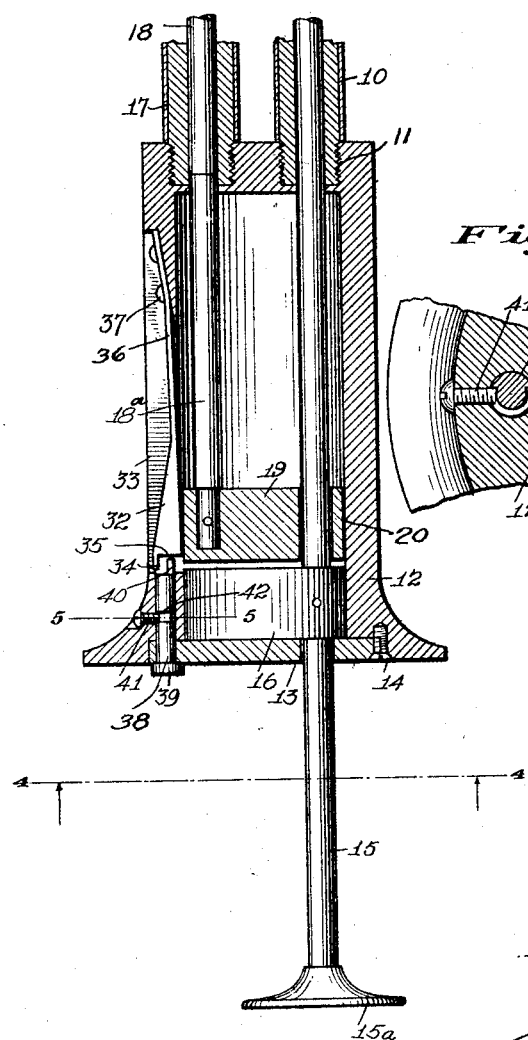
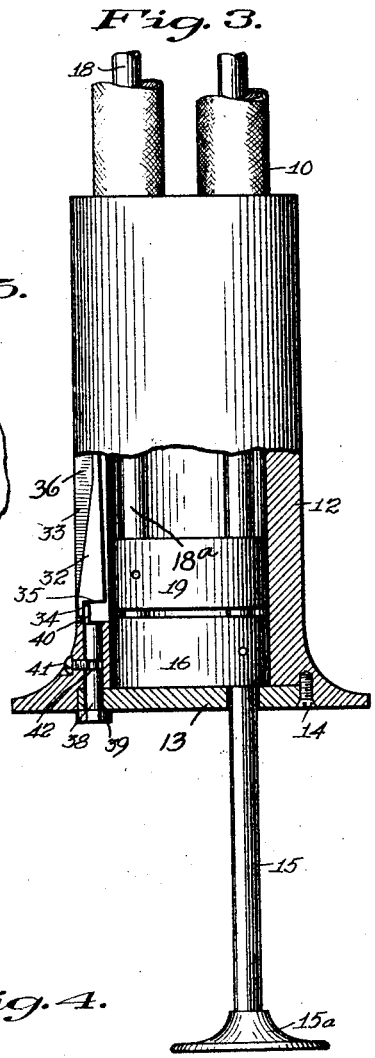
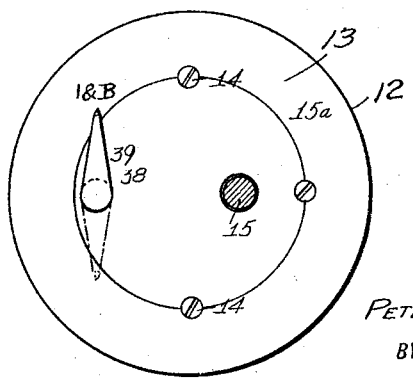
WITNESSES
INVENTOR
PETER F. BEAULIEU
BY
ATTORNEYS

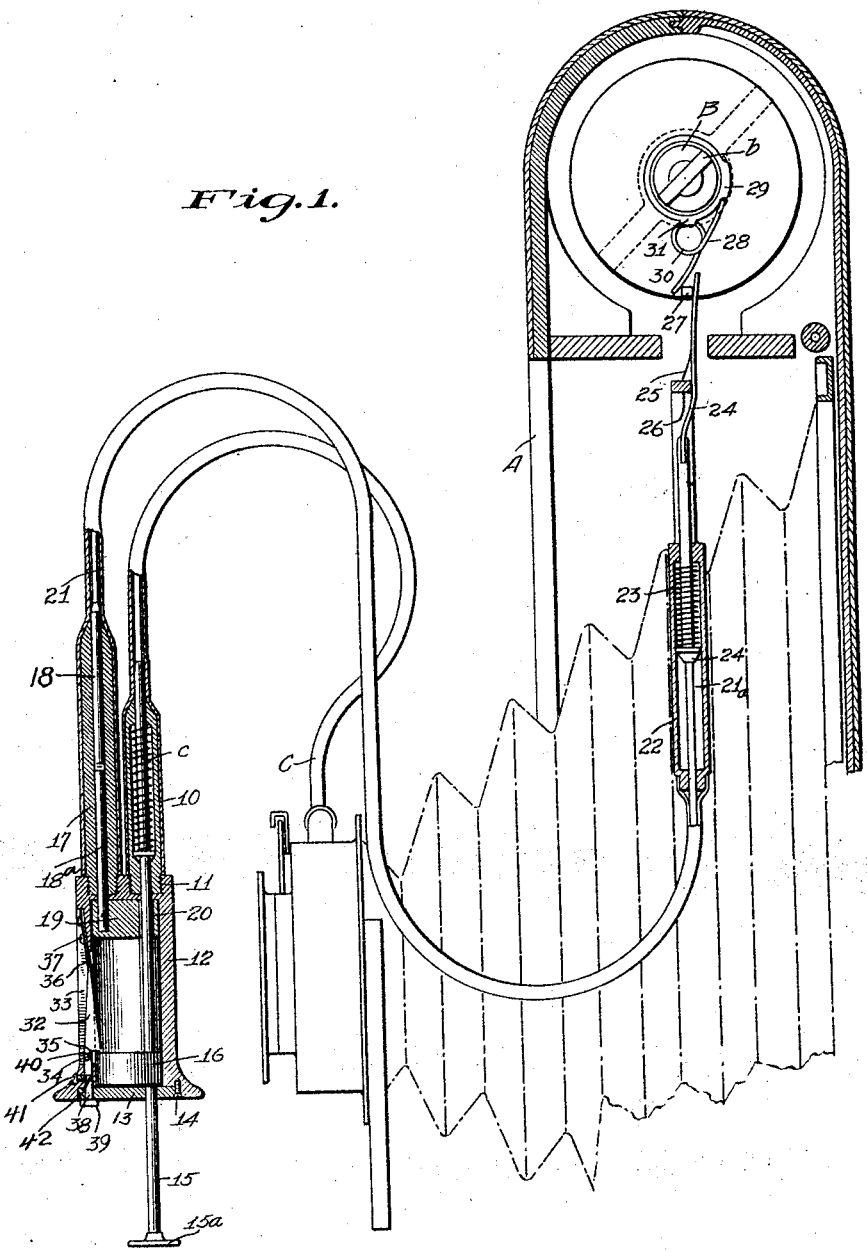

UNITED STATES PATENT OFFICE.

PETER FRANK BEAULIEU, OF BEND, OREGON, ASSIGNOR OF ONE-HALF TO RUTHERFORD H. LOOP, OF DESCHUTES COUNTY, OREGON.

SHUTTER LOCK FOR ROLL-FILM CAMERAS.

1,413,376. Specification of Letters Patent. Patented Apr. 18, 1922.

Application filed February 24, 1921. Serial No. 447,378.

*To all whom it may concern:*

Be it known that I, PETER FRANK BEAULIEU, a citizen of the United States, and a resident of Bend, in the county of Deschutes and State of Oregon, have invented a new and Improved Shutter Lock for Roll-Film Cameras, of which the following is a description.

An object of the invention is to provide a lock for the shutter-operating means and a latch acting to prevent the release of the lock, and itself subject to the turning of the film roll for the release of the lock, the latch being adapted to assume its latched position without being dependent on a predetermined point of stoppage of the film spool after making a complete revolution.

A further object of the invention is to provide novel means for throwing the latch to latching position with the operation of the shutter to be subject to release by the deliberate turning of the film roll.

More specifically, the invention has for an object to provide a structural embodiment of the invention, making for precision in operation.

Reference is to be had to the accompanying drawings forming a part of this specification, it being understood that the drawings are merely illustrative of one example of the invention.

Figure 1 is a sectional elevation of a device embodying my invention showing the same applied to a camera illustrated in part;

Figure 2 is a sectional elevation of the operating means of the shutter lock with one of the pistons in side elevation and one in a section;

Figure 3 is a partly sectional elevation of the devices as shown in Figure 2, a portion of the cylinder and the two pistons being in elevation;

Figure 4 is a section on the line 4—4, Figure 2;

Figure 5 is an enlarged detail horizontal section on the line 5—5, Figure 2.

In Figure 1 a portion of a camera is designated at A, B indicating the end of the spool having the usual slot *b* to receive the locking member of the usual spool-turning handle (not shown); and C indicates the sheathed flexible cable controlling the shutter in the usual manner.

The numeral 10 indicates the housing for a portion of the cable C, *c* indicating the spring surrounding the cable within said housing. The housing 10 is screwed as at 11 into the forward end of a cylinder 12, the rear end of which is closed by a suitable cap plate 13 held in place by a screw 14 or the like. Operating in the cylinder 12 and extending through the rear end thereof is a plunger 15 having a piston 16 thereon within said cylinder 12.

Screwed also to the front end of the cylinder 12 is a housing 17 in which operates a plunger 18 having a piston 19 operating in the cylinder 12 in front of the piston 16, the plunger 15 of the piston 16 passing freely through a hole 20 in the piston 19 so that the latter may be slidable relatively to said plunger 15.

From the front end of the plunger 18 extends a sheathed cable 21, a portion of which cable adjacent to the opposite end has guided longitudinal movement in a frame or housing 22 in fixed position within the camera A at a side thereof. A coil spring 23 surrounds the cable 21 within the housing 22 and abuts at its rear end against a collar 24 on the cable and at its front end against the housing 22 tending to retract the cable after movement by the plunger 18. The cable 21 carries at its terminal beyond the housing 22 a resilient latch 24 having the catch projection 25 thereon adapted to engage on a fixed member 26 which may be part of the frame 22. With the catch 25 in latching engagement with the part 26 the front end of the latch 24 extends adjacent to a fixed lug 27 on the spool B. Secured to the spool B to turn therewith is a spring 28, here shown as formed of a short length of wire secured at one end as at 29 to the spool and formed with a loop 30 which also is secured to the spool B as at 31. The free end of the spring 28 is adapted to engage the lug 27 at the opposite side from the latch 24.

The piston 16 is adapted to be engaged by a locking spring 32 disposed in a longitudinal slot 33 in the side of said cylinder and rabbetted at its rear end to present a lug or flange 34 and a shoulder 35 adapted to extend over the front of the piston 16 for preventing forward movement of the said piston. The lock 32 is integral with a spring 36 secured as at 37 by screws or the like to the cylinder 12 at the exterior.

The camera having been loaded, as usual, the locking means described will be ready to make an exposure. At this time both the pistons 16 and 19 will be at the rear end of the cylinder 12 as shown in Figures 2 and 3 and the movement of said piston 19 to a position adjacent the rear end of the cylinder will have engaged the lock 32 and flexed the same laterally outward from in front of the cylinder 16, thereby leaving said cylinder 16 free to be moved forward by a forward pressure on the pushbutton 15ᵃ of the plunger 15. Upon the button 15ᵃ being pressed the plunger 15 will move forwardly carrying with it the pistons 16 and 19. The forward movement of the piston 16 will release the shutter and the forward movement of the piston 19 will, through the flexible cable 21, move the latch 24 to the latching position of Figure 1, into engagement with the fixed part 26 and with its end adjacent to the lug 27. Upon release of the pushbutton 15ᵃ and plunger 15, the spring c will carry said plunger and the piston 16 to the rear of the cylinder 12 and cause said piston 16 to be automatically engaged by the lock 32, so that the plunger 15 cannot again be moved forwardly to cause a double exposure until the piston 19 is returned to the rear end of the cylinder adjacent to the piston 16 to bring about the disengagement of the lock 32. The piston 19 is prevented from rearward movement toward the piston 16 and lock 32 because the latch 24 is engaged with the part 26. The latch 24 will, however, be released when the spool B is turned and with it the spring 28, said spring riding over the lug 27 and tripping the latch 24 stressing the same laterally to disengage its catch 25 from the part 26, whereupon the spring 23 will retract the latch 24, cable 21, and plunger 18 and piston 19, causing the latter to move rearwardly and disengage the lock 32.

That end 18ᵃ of the plunger 18 which is secured to piston 19 may, as shown, be separate from the remainder of the plunger.

The latch 24 is free to move forwardly to the forward position upon the next forward movement of the pushbutton 15ᵃ and plunger 15 without being dependent on a given predetermined stoppage of the spool B after making a complete revolution.

I provide manually operable means to optionally release the lock 32 for time exposure when desired, for which purpose use is made of a short spindle 38 having a pointer 39 outside of the cap 13, said spindle extending through the cap and forwardly into the material of the cylinder 12, the front end of said spindle having an off-center finger 40 which, by the turning of the spindle, is adapted to engage the finger 34 on the lock 32 to flex said lock to the release position and out of control relation to the piston 16. Figure 4 shows in full lines the pointer 39 of spindle 38 in the position of the spindle for instantaneous and bulb exposures with the lock 32 functioning. The dotted lines in Figure 4 indicate the pointer 39 in position for time exposure in which position of the pointer the lock 32 will be inoperative.

The spindle 39 is shown as held against longitudinal displacement while permitted to turn by reason of a screw 41 in the side of the cylinder engaging at its inner end in an annular groove 42 in said spindle.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. The combination with the shutter-controlling means of a camera and the operating means therefor, of a latch for said operating means, spring-pressed latch-releasing means tending to move to a position to release the latch, means to restrain the latch-releasing means from moving to release position, and trip means for said restraining means, said trip means adapted to be mounted on a camera spool to turn therewith.

2. In combination with a camera-shutter controlling means and the actuating means therefor: a lock to prevent said actuating means from being operated, means tending to disengage the lock from the actuating means, latch means to restrain the last-mentioned means from acting on the lock, means to release the latch means, said last means being adapted to be mounted to turn with a film spool of the camera, and means operable by the shutter-actuating means to restore said lock-engaging means and latch means.

3. In a camera, the combination with the shutter-controlling means, its actuating means and a film spool of the camera; of a lock for said actuating means, lock-releasing means operable by said actuating means to move said lock-releasing means away from the lock, means tending to actuate said lock-releasing means to release the lock, means to restrain said lock-releasing means and its actuating means, a trip for the restraining means turnable with said spool, said restraining means being movable in a direction to restore the same by the first-mentioned actuating means and being movable to a restored position independently of any given movements of the film spool beyond a complete revolution.

4. In a device of the class described, a cylinder, a piston therein, a plunger carrying said piston and extending to the exterior of the cylinder for manual operation, a flexible cable subject to the movements of said plunger and adapted for connection with the shutter-controlling mechanism of a camera, a second piston in advance of the first-mentioned piston, a flexible cable subject to the operations of said second piston, a spring tending to act on said second flexible cable to move the second piston toward the first piston, a latch on the second cable, means to engage said latch for restraining said cable against the action of said spring, trip means adapted to be secured to a film spool of the camera to turn therewith, and a lock for the first-mentioned piston to prevent movement thereof for operating the shutter, said lock being releasable by the second piston in moving toward the first piston.

5. A camera attachment of the class described including a cylinder, a piston therein, a plunger carrying said piston and operative from the exterior of the cylinder, means subject to said plunger and adapted for connection with the shutter-controlling means of a camera, a second piston in said cylinder movable toward or from the first piston, a lock for the first-mentioned piston controlled by a movement of the second piston toward the first piston, means to actuate the second piston toward the first piston for releasing the lock and permit the pistons to move forwardly in response to a forward movement of said plunger, restraining means for the actuating means of the second piston, and means adapted to be mounted on a spool of the camera for tripping said controlling means by a turning movement of the spool.

PETER FRANK BEAULIEU.